United States Patent [19]

Harpell et al.

[11] Patent Number: 5,135,804
[45] Date of Patent: Aug. 4, 1992

[54] NETWORK OF POLYETHYLENE FIBERS

[75] Inventors: Gary A. Harpell, Morristown; Sheldon Kavesh, Whippany; Igor Palley, Madison; Dusan C. Prevorsek, Morristown, all of N.J.

[73] Assignee: Allied-Signal Inc., Morristown, N.J.

[21] Appl. No.: 529,673

[22] Filed: May 29, 1990

Related U.S. Application Data

[63] Continuation of Ser. No. 358,501, May 30, 1989, abandoned, which is a continuation of Ser. No. 808,681, Dec. 16, 1985, abandoned, which is a continuation of Ser. No. 467,997, Feb. 18, 1983, abandoned.

[51] Int. Cl.$^5$ .................. B29C 43/02; B29K 23/00
[52] U.S. Cl. ................... 428/296; 428/357; 428/221; 428/98; 264/324
[58] Field of Search ......... 264/123, 125, 126, 119, 264/324; 156/167; 428/288, 296, 357, 221, 98

[56] References Cited

U.S. PATENT DOCUMENTS

| | | | |
|---|---|---|---|
| 3,231,650 | 1/1966 | Findlay et al. | 428/296 |
| 3,436,298 | 4/1969 | Oppenlander et al. | 428/296 |
| 3,452,128 | 6/1969 | Rains | 264/126 |
| 3,650,866 | 3/1972 | Prentice | 264/126 |
| 3,660,555 | 5/1972 | Rains et al. | 264/126 |
| 3,847,888 | 11/1974 | Baumgaertner | 264/126 |
| 3,972,759 | 8/1976 | Buntin | 156/167 |
| 3,975,481 | 8/1976 | Baumgaertner | 264/126 |
| 4,110,391 | 8/1978 | Beizer et al. | 264/126 |
| 4,115,499 | 9/1978 | Salyer et al. | 264/126 |
| 4,137,394 | 1/1979 | Nheihuisen et al. | 528/502 |
| 4,315,965 | 2/1982 | Mason et al. | 264/126 |
| 4,356,138 | 10/1982 | Kavesh et al. | 264/164 |
| 4,413,110 | 11/1983 | Kavesh et al. | 526/348.1 |
| 4,436,682 | 3/1984 | Knopp | 264/126 |
| 4,455,273 | 6/1984 | Harpell et al. | 264/184 |

FOREIGN PATENT DOCUMENTS

| | | |
|---|---|---|
| 0580069 | 7/1959 | Canada . |
| 0055001 | 6/1982 | European Pat. Off. . |
| 0064167 | 11/1982 | European Pat. Off. . |
| 2042414 | 2/1979 | United Kingdom . |
| 2051667 | 6/1979 | United Kingdom . |

Primary Examiner—Hubert C. Lorin

[57] ABSTRACT

A network of non-porous polyethylene fibers substantially free of voids formed by preparing a network of gel spun fibers, applying pressure to the network at a temperature and pressure and for a time adequate to form a translucent film substantially free of voids.

2 Claims, No Drawings

NETWORK OF POLYETHYLENE FIBERS

This application is a continuation of application Ser. No. 358,501 filed May 30, 1989, now abandoned, which is a continuation of Ser. No. 808,681 filed Dec. 16, 1985, now abandoned which is a continuation of 467,997, filed Feb. 18, 1983, now abandoned.

DESCRIPTION

BACKGROUND OF THE INVENTION

The present invention relates to a process of fabricating fibrous networks such as fabrics and to articles produced therefrom, and especially to articles produced from high tenacity/high modulus polyethylene fibers.

High performance (that is high tenacity and modulus) polyethylene fibers are known to be produced by two general types of processes. Such fibers are drawn from a supersaturated solution in the processes of U.S. Pat. No. 4,137,394 of Meihuisen et al. (1979) and U.S. Pat. No. 4,356,138 of Kavesh et al. (Oct. 26, 1982). Such fibers are produced by gel spinning and stretching in the processes of Stamicarbon's United Kingdom Patent Applications 2,042,414 and 2,051,667 and U.S. Pat. No. 4,413,110. It is also known to prepare modified fibers of the above types by gel spinning the ultrahigh molecular weight polyethylene with various inorganic fillers (Stamicarbon's European Patent Application 55,001 published Jun. 30, 1982) and with polymeric modifiers as in our U.S. Pat. No. 4,455,273, commonly assigned. Such fibers be characterized generally by having a weight average molecular weight at least about 500,000 (preferably at least about a million), a tenacity of at least about 20 g/denier (preferably at least about 30 g/denier), a tensile modulus or tenacity at least about 500 g/denier (preferably at least 1,000 g/denier and more preferably at least 1,400 g/denier). Furthermore, it is described in U.S. Ser. No. 429,942 of Kavesh, Prevorsek and Harpell, filed Sep. 30, 1982, copending and commonly assigned, U.S. Pat. No. 4,819,458 to heat set or heat shrink certain of the above fibers in the form either of multi-filament yarns or of fabrics.

Certain of our copending, commonly assigned patent applications also describe composites prepared by using certain of such polyethylene fibers as the fiber component in various matrices as described, for example, in our U.S. Pat. No. 4,501,856 (certain thermoplastic matrices), our U.S. Pat. No. 4,563,392 (coated fibers placed in various thermoplastic and thermosetting matrices) (both filed Mar. 19, 1982) and the above-referenced U.S. Pat. No. 4,455,273 (polymer modified fibers placed in thermosetting matrices). While such composites make excellent use of the fiber properties in many applications, for certain applications the properties of a composite are desired with the highest possible fiber content. Furthermore, for certain applications articles substantially free of voids and/or translucent or transparent articles are desired.

BRIEF DESCRIPTION OF THE INVENTION

It has been discovered that articles of extraordinary properties can be prepared by applying pressure to a network of high performance polyethylene fibers at elevated temperature without substantially impairing the physical properties of the fiber. Accordingly, the present invention includes a process for the production of polyethylene articles which comprises applying pressure to a network of fibers consisting essentially of polyethylene having weight average molecular weight at least about 500,000, said fibers having a tenacity at least about 20 g/denier and tensile modulus at least about 500 g/denier, at a temperature between about 100° C. and about 160° C., and at a pressure and for a time sufficient to cause adjacent fibers to adhere. Preferably, the pressure and time are sufficient to deform the fibers and substantially eliminate the voids, and more preferably the pressure and time are sufficient to form a translucent, and most preferably a transparent article substantially free of voids.

The present invention also includes various articles prepared by the above-described process, including articles prepared by application of the above-described process to fabrics.

DETAILED DESCRIPTION OF THE INVENTION

The precursor fibers of the present invention may be prepared by any of the various processes of the above-referenced Kavesh et al., Meihuisen et al., Stamicarbon patents and patent applications, as well as by modifications of these processes described by various authors including Pennings, Smith, Lemstra and their co-authors. The properties of these fibers can be differentiated from ordinary polyethylene fibers in having a weight average molecular weight at least about 500,000 (preferably at least about a million and more preferably between about two million and about six million), a tenacity at least about 20 g/denier (preferably at least about 30 g/denier), and a tensile modulus at least about 500 g/denier (preferably at least about 1,000 g/denier, more preferably at least about 1,400 g/denier and most preferably at least about 1,600 g/denier). These properties, and especially the preferred and more preferred forms of these properties, are best achieved by the process U.S. Pat. No. 4,413,110, the disclosure of which is incorporated herein by reference. Other physical properties typical of the fibers prepared by the process disclosed in U.S. Pat. No. 4,413,110 are a main melting temperature (by DSC, differential scanning calorimetry, at 10° C. per minute) at least about 147° C., porosity less than 10% and creep less than 5% (at 23° C. for 50 days at 10% of breaking load).

The fibers should consist essentially of polyethylene. In addition to such fibers prepared with polyethylene as substantially the only polymeric component, fibers with polymeric modifiers as described in U.S. Pat. No. 4,455,273 (the disclosure of which is incorporated herein by reference) may also be used. Such polymeric modifiers include minor proportions of lower molecular weight polyethylene or polypropylene, ethylene-propylene copolymers (including elastomeric copolymers), ethylene copolymers with various comonomers having ethylene crystallinity, and oxidized polyethylene. A preferred class of additives are copolymers of ethylene with polar comonomers such as acrylic acid which may improve adherence between fibers in the articles of the present invention. Such modified fiber could be treated (e.g. with NaOH solution) prior to compression. The mineral filled fibers of European Patent Application 55,001, supra, also be used.

For the practice of the present process, such fibers are formed into a network. The use of networks without matrices eliminates the need for manipulating a separate matrix material. One form of such network is a fabric, including fabrics prepared by various weaves including plain (tabby) weave, basket weave and satin weave;

although other, more elaborate weaves such as triaxial weaves may also be used. It is contemplated that either the multifilament yarns used in preparing the fabrics or the fabrics themselves may be heat set or heat shrunk (in the absence of applied pressure) prior to the practice of the present invention. In addition to fabrics, however, the networks used for the practice of the present invention may also include various constrained or unconstrained arrangements of fibers including substantially parallel arrays (including filament windings and pultrusions), layered arrays with each layer having substantially parallel fibers and adjacent layers being non-parallel to each other and randomly oriented chopped or continuous fibers.

In the present process, pressure is applied to the fibrous network at a temperature between about 100° C. and about 160° C., with the pressure and time being sufficient to achieve one of four different levels of fabrication. The minimum level of fabrication is that pressure and time sufficient to cause adjacent fibers to adhere. Such a minimum level of treatment may be applied to non-fabric arrays where it is desired to obtain a non-woven fabric as the polyethylene article. A more substantial amount of pressure (and/or time) is applied if it is desired to deform the fibers and substantially eliminate voids. This result is normally obtained when it is desired to form a film-like article which is substantially free of voids, and especially has reduced gas and liquid permeability and has a high degree of in-plane stiffness, bending stiffness and resistance to shear. Once such film-like articles are formed, they may be further processed by stamping, vacuum forming or similar operations.

The temperature of the present process may vary from about 100° C. to about 160° C., with about 110° C. to about 155° C. being preferred. For some applications, the range of about 140° C. to about 155° C. is more preferred. It is considered particularly surprising that these higher temperatures are effective and do not substantially degrade film properties given that the polyethylene used generally has a melting temperature of approximately 138° C. (by DSC at 10° C./min) and the fiber a main melting temperature of 144–158° C., depending upon the mode of preparation. It is also surprising that the fabrication process is effective at the lower temperatures to promote adhesion and other effects described below.

For particular embodiments, time, temperature and pressure are selected in combination, with less time generally being necessary or desirable as either pressure or temperature are increased. Pressure may vary widely, with pressures of 0.5-1 MPa being typical when the present process is practiced in an autoclave or similar apparatus, and pressures of 1-200 MPa being typical when the present process is practiced in a molding press or similar apparatus. In molding embodiments, a vacuum can be used to expedite elimination of voids. Times may vary widely, such as from one-tenth, one or a few seconds to five minutes or even twenty or thirty minutes. Preferred times for molding press embodiments are between about thirty seconds and about ten minutes. Required times will increase with increasing thicknesses.

Four levels of fabrication may be achieved by the present process. The first level is adherence of adjacent fibers in either a loose network or a fabric. The product in this case may be a non-woven fabric. Temperatures for such first level processes are typically 100–150° C., pressures are typically 0.5–5 MPa and times are typically one-tenth second—ten minutes. The second level, which may be applied to any form of fiber network, is that sufficient to deform the fiber and substantially eliminate voids. In some cases this is accomplished to convert air permeable fabrics or other networks to air-impermeable film-like structures, as when sails are being made. In other cases, this is accomplished to achieve an article having at least 80% of the density (by water displacement) of the parent polymer. In still other cases, this is accomplished to provide articles (e.g. ballistic-resistant articles) requiring a substantial force to displace fibers in the article and thereby absorb close to the full energy of fiber breakage before the article is penetrated.

The third and fourth levels of fabrication which may be achieved by the present process go beyond the second level to produce articles that are either translucent or transparent. Such terms have well-understood meanings in the film art, and can be distinguished by the procedures of ASTM D-1003, "Haze and Transmittance of Transparent Plastics". Preferred translucent articles have a transmittance value of at least 10%, preferably at least 40%. It should be noted that these properties are determined on the article produced, regardless of thickness (not on a standard thickness article). In general, more time, higher temperatures and/or more pressure are required to achieve higher levels of fabrication by the present process.

It has been found that the fiber properties, and especially tenacity (and to a lesser extent modulus) are either improved or, at least, are not degraded to a substantial extent, by preferred forms of the present invention. This is particularly surprising when the molding temperature exceeds the melting temperature of the precursor fiber. Preferred process conditions are those wherein the tensile strength (in grams per denier) of the article after fabrication is at least the following percentages of the same property for the starting fiber network:

| Level 1: | at least 70%, more preferably at least 90% |
| Level 2: | at least 65%, more preferably at least 80% |
| Level 3: | at least 60%, more preferably at least 75% |
| Level 4: | at least 55%, more preferably at least 75% |

EXAMPLE 1

The following experiments illustrate the retention of tensile properties by fibers prepared in accordance with U.S. Pat. No. 4,413,110 of Kavesh et al. The fiber used was a 32-filament, 147-denier yarn prepared generally in accordance with Example 536 U.S. Pat. No. 4,413,110, employing ratios on gel fiber of 2:1 at room temperature, 5.75:1 at 120° C. and 2:1 at 150° C. The stretched gel fiber was extracted with trichlorotrifluoroethane and dried. The product 32-filament yarn had 31 g/den tenacity, 1700 g/denier modulus and an elongation to break of 2.8%.

Lengths of the yarn were placed in an air circulating oven at various temperatures from 120° C. to 155° C. for 8.5 minutes, with some yarn samples held at constant dimension, others being free to contract. Ten individual randomly selected filaments were then taken from each yarn sample and tested on an Instron Tensile Testing Machine using a 2 inch (5.08 cm) gage length and a 2 inch/minute (5.08 cm/min) head speed. The average tenacity values for ten monofilament at each of twelve conditions (one untreated yarn, five yarns heated at constant length and six yarns heated inconstrained) are shown in Table 1.

TABLE 1

| Temperature | Average Filament Tenacity at Constant Length | Yarn Shrinkage | Average Filament Tenacity of Shrunk Fiber |
|---|---|---|---|
| Control | 44 | — | — |
| 120° C. | 45 | 1.4% | 43 |
| 130° C. | 39 | 1.9% | 32 |
| 139° C. | — | 3.8% | 43 |
| 145° C. | 36 | 7.7% | 36 |
| 150° C. | 40 | 35.0% | 21 |
| 155° C. | 41 | 37.0% | 11 |

The results show essentially complete retention of physical properties over the entire 120-155° C. range for constrained fibers, and over the lower portion thereof (120-145° C.) for unconstrained fibers.

EXAMPLES 2-4

A sample of the same fiber used in Example 1 was analyzed by wide-angle x-ray crystallography and determined to have a crystallinity index of 73% by the method of P. H. Hermans and A. Weidinger, Makromol. Chem., vol. 44, pp. 24-36 (1961). Three pairs of plaques were then prepared by winding the fiber around a 3-inch square (7.6 cm by 7.6 cm) Apollo aluminum plate and molding for 5 minutes at a pressure of 46 MPa. The films produced were essentially transparent, with small opaque areas. The fiber weight (in grams), mold temperature and crystalline index (in percent) are shown in Table 2.

TABLE 2

| Example | Fiber Weight | Mold Temp. | Crystalline Index |
|---|---|---|---|
| 2 | 1.30 | 140° C. | 78% |
| 3 | 1.32 | 147° C. | 81% |
| 4 | 1.21 | 150° C. | 82% |

The results show increased degree of crystallinity for the matrix-free molded plaques compared to the precursor fiber.

EXAMPLE 5

Properties of fibers used to prepare the fabric are summarized below, with tenacity and modulus given in grams per denier:

| | Yarns Employed | | | | Average Areal |
|---|---|---|---|---|---|
| | Filaments | Denier | Ten | Mod | Density As Made |
| Warp | 100 | 1086 | 31.6 | 1116 | 0.23 kg/m$^2$ |
| Warp | 100 | 1197 | 29.7 | 1030 | |
| Fill | 100 | 1057 | 31.5 | 1075 | |

The yarns of the fabric were twisted 0.28 turns/inch (0.11 turns/cm) and the fabric contained about 0. 24 ends/inch (9.4 ends/cm) in both warp and fill directions.

Two-ply samples of the fabric were molded at a pressure of 24.1 MPa and temperature of 140° C. for 5 minutes in a mold, keeping the ends taut in a frame. These samples (areal densities 0.478 and 0.472 kg/m$^2$) were tested for ballistics resistance in the manner described in U.S. Pat. No. 4,403,012 of Harpell et al., filed Mar. 19, 1982, and commonly assigned, with initial 22 caliber fragment velocities of 1145 and 1118 feet/second (349 and 341 m/sec), and showed energy absorption values of 62.9 and 54.7 Jm$^2$/kg, respectively. These results are better than energy absorption values of 47.5 and 48.1 Jm$^2$/kg for untreated pieces of Fabric 6 and at least as good as the 40-62 Jm$^2$/kg energy absorption value for heat-set pieces of fabric 6 (at 130°, 145° and 155° C. in a frame). The corresponding values for a KEVLAR ® 29 fabric are 33-41 Jm$^2$/kg.

Similar molded fabrics appeared generally equivalent to KEVLAR ® 29 fabrics in the areal density required to stop penetration by 0.13 gram fragments with initial velocities about 2200 ft/sec (671 m/sec).

EXAMPLE 6

Six plaques were then prepared from fibers only (using a 100 filament, 1384 denier twisted yarn of 27.3 g/den tenacity and 963 g/den modulus) by winding successive layers at right angles around a 3 inch by 3 inch (6.7 cm × 6.7 cm) aluminum plate. Molding three wound plates at 5, 15 and 30 tons (4.3, 12.9 and 25.8 MPa) pressure produced six plaques, each having an areal density of about 1 kg/m$^2$. Firing 22 caliber fragments at these plaques produced the results shown in Table 3.

TABLE 3

| Pressure (MPa) | Areal Density (kg/m$^2$) | Velocity In (m/sec) | Energy Absorption Jm$^2$/kg |
|---|---|---|---|
| 4.3 | 1.133 | 346 | 30.8 |
| 4.3 | 1.133 | 344 | 31.8 |
| 12.9 | 1.093 | 349 | 38.5 |
| 12.9 | 1.093 | 348 | 39.7 |
| 25.8 | 1.005 | 350 | 36.4 |
| 25.8 | 1.005 | 356 | 32.1 |

This procedure was repeated using various 16 and 64 filament (116-181 and 361-429 denier, respectively) yarns of 29-31 g/den tenacity, 1511-1590 g/den modulus and also using, in some cases, various amounts of HDPE film as a matrix. Energy absorption (based on fiber content) was 33-43 Jm$^2$/kg in all instances and appeared generally independent of fiber/matrix ratio. This suggests that molded articles with fiber only could have the highest energy absorption on a total weight basis.

EXAMPLE 7

One inch square (2.54 cm × 2.54 cm) samples were cut from Fabric 4 of U.S.S.N. 429,942. This fabric was prepared by combining multifilament yarns of 30-32 g/denier (prepared generally in accordance with U.S. Pat. No. 4,413,110 to give yarns of approximately 900 denier (with 112 and 128 filaments for the two combined yarns), twisted 0.16 turns/cm and woven to give an areal density of approximately 0.22 kg/m$^2$, 9.5 warp ends/cm and 9.5 fill ends/cm. The small squares were molded at 2, 10 or 20 tons (27, 136 or 272 MPa) for 1, 2 or 10 minutes at 110° C., 139° C. or 144° C. as indicated in Table 4. The observed properties are shown in Table 4.

TABLE 4

| Square | Temp | Pressure (MPa) | Time (min) | Properties of Molded Square |
|---|---|---|---|---|
| A | 144° C. | 136 | 10 | Clear, noticeable pattern |
| B | 139° C. | 272 | 10 | Clear, noticeable pattern |
| C | 110° C. | 272 | 10 | Translucent |
| D | 110° C. | 272 | 2 | More opaque than C |

TABLE 4-continued

| Square | Temp | Pressure (MPa) | Time (min) | Properties of Molded Square |
|---|---|---|---|---|
| E | 110° C. | 27 | 1 | Most opaque |

All five plaques were apparently film-like in the sense of freedom from gaps. Plaques A and B were most clear (essentially transparent), with a visible square pattern attributable to the weave of the precursor fabric.

EXAMPLE 8

Samples 21 cm in length and 1.3-1.4 cm in width were cut from Fabric 2 of U.S.S.N. 429,942. The fibers used (called D, F and G) were 96, 128 and 96 filament yarns of 27, 32 and 33 g/den tenacity and approximately 1100, 1400 and 1400 g/denier modulus. Molding was conducted at 120° C., 140° C., 145° C. and 150° C. for 2 minutes at 20 tons force (68 MPa pressure). The tenacity of molded fabric strips and a strip not molded are shown in Table 5.

TABLE 5

| Sample | Molding Temp. | Breaking Load (Kg) | Denier | Tenacity (g/den) |
|---|---|---|---|---|
| A | 120° C. | 218 | 30,000 | 7.26 |
| B | 150° C. | 163 | 30,000 | 5.45 |
| C | 145° C. | 200 | 29,960 | 6.67 |
| D | 140° C. | 182 | 29,790 | 7.32 |
| Fabric Control | — | 213 | 33,650 | 6.34 |

It appears that tensile strengths above that of the fabric are achieved by molding at 120° C., 140° C. and, possibly, 145° C. The material molded at 150° C. showed a 14% loss of tensile strength.

We claim:

1. A network of non-porous polyethylene fibers substantially free of voids formed by process consisting essentially of the steps of:
    (a) preparing a network of gel spun fibers having a weight average of molecular weight of at least about 1 million, a tenacity of at least about 20 g/denier and a tensile modulus at least about 1,000 g/denier
    (b) applying pressure to said network of fibers at a temperature ranging from 110° C. to 155° C. and at a pressure and for a time adequate to form a translucent film substantially free of voids and wherein the tensile strength of the original fiber in the network is retained at a level at least 75 percent of the original fiber.

2. The product of claim 1 wherein the molding temperature ranges from 140° C. to 155° C.

* * * * *